United States Patent [19]
Burge et al.

[11] Patent Number: 5,737,079
[45] Date of Patent: Apr. 7, 1998

[54] SYSTEM AND METHOD FOR INTERFEROMETRIC MEASUREMENT OF ASPHERIC SURFACES UTILIZING TEST PLATE PROVIDED WITH COMPUTER-GENERATED HOLOGRAM

[75] Inventors: James H. Burge; David S. Anderson, both of Tucson, Ariz.

[73] Assignee: Rayleigh Optical Corporation, Tucson, Ariz.

[21] Appl. No.: 682,387

[22] Filed: Jul. 17, 1996

Related U.S. Application Data

[63] Continuation of Ser. No. 336,740, Nov. 7, 1994, abandoned.
[51] Int. Cl.$^6$ ..................................................... G01B 9/02
[52] U.S. Cl. ........................... 356/348; 356/359; 356/360
[58] Field of Search ................................. 356/347, 348, 356/359, 360

[56] References Cited

U.S. PATENT DOCUMENTS

| | | | |
|---|---|---|---|
| 4,824,193 | 4/1989 | Maeda et al. | 350/3.72 |
| 5,039,223 | 8/1991 | Gemma et al. | 356/348 |
| 5,245,402 | 9/1993 | Adachi | 356/124 |
| 5,416,586 | 5/1995 | Tronolone | 356/359 |
| 5,424,828 | 6/1995 | Minami | 356/359 |

FOREIGN PATENT DOCUMENTS

| | | |
|---|---|---|
| 0531909A1 | 9/1992 | European Pat. Off. . |
| 4130516A1 | 6/1993 | Germany . |

OTHER PUBLICATIONS

Full–aperture interferometric test of convex secondary mirrors using holographic test plates, Advanced technology Optical Telescopes, Author: J.H. Burge and D.S. Anderson, V,L. Stepp, Editor, Proc. SPIE 2199, pp. 181–192, (1994) (no month available).

Measurement of a convex secondary mirror using a holographic test plate, Author: J.H. Burge, D.S. Anderson, T. D. Milster and C. L. Vernold, Advanced technology Optical Telescopes V,L. Stepp, Editor, Proc. SPIE 2199, pp. 193–198, (1994) (no month available).

A full–aperture optical test for large convex aspheric mirror, Author J.H. Burge and D.S. Anderson Proc. Amer. Soc. for Precision Engineering, vol. 8, (ASPE, Raliegh, NC, 1993) pp. 29–32 (no month available).

*Primary Examiner*—Frank G. Font
*Assistant Examiner*—Amanda Merlino
*Attorney, Agent, or Firm*—Benman & Collins

[57] ABSTRACT

An interferometer including a test plate member having a computer-generated hologram (CGH) written on the reference surface. In a preferred testing configuration, the interferometer setup includes a laser light source, diverger lens, beamsplitters, collimators, and other auxiliary optics arranged in a common-path (Fizeau-type) configuration to minimize measurement errors for testing an optical test piece with the test plate member having the computer-generated hologram. By having the computer-generated hologram written directly on the reference surface of the test plate member, the measurement of aspheric optical surfaces is made with greater precision, more efficient, and with less cost than prior art interferometers and associated methods.

25 Claims, 4 Drawing Sheets

SYSTEM AND METHOD FOR INTERFEROMETRIC MEASUREMENT OF ASPHERIC SURFACES UTILIZING TEST PLATE PROVIDED WITH COMPUTER-GENERATED HOLOGRAM

This is a continuation of application Ser. No. 08/336,740 filed on Nov. 7, 1994, now abandoned.

FIELD OF THE INVENTION

This invention relates to improvements to interferometers and methods of testing and measuring of aspheric optical surfaces. More particularly, the invention relates to improvements to common-path interferometers by utilization of computer-generated holograms (CGH) for testing of aspheric optical surfaces.

DESCRIPTION OF THE PRIOR ART

The precision to which an optical surface can be fabricated is largely driven by how precisely it can be tested. The advent of the laser and phase-measuring interferometry has given fabricators powerful tools to measure optical surfaces to within a few nanometers departure from the theoretically perfect optical surface. Although the use of interferometry has made the testing of flats and spherical surfaces relatively simple, testing aspheric surfaces, particularly convex ones, has traditionally been a difficult and expensive task.

It is well established that when interferometrically testing aspheric surfaces the highest precision is obtained if the aspheric surface is tested in a null configuration where the reference wavefront and the ideal test wavefront have exactly the same shape. When tested in this manner, any errors in the test measurement are interpreted directly as errors in the test surface. Additionally, it is highly advantageous that the test be performed in a common-path mode, such as in a Fizeau interferometer. In a common-path interferometer, both the test beam path and the reference beam path follow very nearly identical paths through the interferometer with the reference surface, or the test surface depending on the test set-up configuration, acting as a beamsplitter to split the two beams. The common-path optical arrangement is known to largely eliminate measurement problems due to environmental effects of vibration and air-turbulence on the beams. This is particularly true when using phase-measuring techniques to obtain highly precise measurements.

A number of methods have been developed for testing aspheric surfaces in null configurations. The most common is to use a spherical reference wavefront and to arrange the asphere, along with some auxiliary optics, to turn the aspheric test wavefront into a spherical wavefront resulting in a null test. The Hindle test for convex hyperboloidal secondary mirrors is an example of this. The difficulty of this approach is that the auxiliary optics are often very large and difficult to fabricate in themselves, and obtaining high quality results requires high quality calibration of the auxiliary optics when performing the test. In addition, this type of test arrangement is not a common-path mode test and is subject to environmental errors.

Another method of measuring aspheric surfaces is to fabricate an aspheric test plate that has on its reference surface the exact inverse of the theoretically perfect shape of the aspheric test piece. When the aspheric test plate is placed proximate the aspheric test piece, and then illuminated with sufficiently coherent light, fringes of interference show the shape difference between the two parts. This configuration is preferably a common-path test configuration where both the reference wavefront and the test wavefront are aspheric, and one which results in a null test configuration. Any wavefront errors induced by the illumination system and test plate homogeneity are common to both the reference and test wavefronts and therefore do not show up in the test measurement. Also, since the aspheric test plate can be placed very close to the aspheric test piece surface, environmental effects are vastly reduced. The great disadvantage of this testing arrangement is the requirement of having to fabricate an aspheric test plate having the same degree of difficulty as the aspheric test piece. Accurate measurement of the aspheric test plate itself becomes the limiting factor in the use of this method.

Another method of testing aspheric surfaces is by using an arrangement that includes using a computer-generated hologram (CGH). FIG. 1 shows a prior art arrangement 100, known as a modified Twyman-Green interferometer, where a laser 101 produces a coherent light source 200 which is optically manipulated through an arrangement of beamsplitters and mirrors 102, 103, 104 that produce light beams 201, 202, 203, 205 which facilitate imaging the aspheric surface of an aspheric test piece 106 by optically manipulating test wavefront 204, 204r via diverger lens 105 onto a CGH 110, and imaged onto image plane 109 via lens 107 and spatial filter 108. The arrangement at the same time uses diffraction to alter a collimated reference wavefront 202 to give it the shape expected by the test wavefront. For background purposes, and in reference to FIG. 2, CGH 110 is a diffraction grating that uses a spatial variation in ruling frequency to create a desired change in a wavefront. In one aspect, this physical characteristic of a CGH causes changes in a light ray's direction according to the grating equation for the optical path difference, namely OPD=s(sin 0o+sin 0m)= mλ(λ is the wavelength of the incident light), where, as shown in FIG. 2, the geometry and the terms are defined as: OPD=optical path difference for incident light through adjacent slits, 0o, 0m=incident and diffracted angles with respect to axis A—A, m=order of diffraction and s=local ruling spacing. In another aspect, CGH 110 may equivalently change the wavefront phase. When used in the mth order, CGH 110 adds m waves of optical path to the wavefront for each ruling cycle. Referring back to FIG. 1, the reference and test wavefronts 205 interfere at the plane of CGH 110 and give a measure of the difference between the test wavefront 204, 204r and the resulting wavefront 206 created by the CGH 110. One of the principal difficulties in performing a high precision test, (nanometer precision), of an aspheric surface is the requirement that the diverger optics, by example beamsplitters and mirrors 102, 103, 104, and diverger lens 105, must be well known when designing CGH 110. As depicted in FIG. 1, since the aspheric test wavefront 204r must return back through the diverger lens 105 to obtain a null test, the exact paths of these rays must be known. For large, fast, or convex aspherics this can be a difficult task. In addition, this test configuration is not a common-path test and both arms of the interferometer must be well known for the test to be highly accurate. Further, spatial filter 108 is required to block the unwanted orders of diffraction. Also, a large amount of tilt must be created by CGH 110 to cause the orders to fan out at the spatial filter, for enabling the isolation of a pure reference and pure test beam. This wavefront tilt, which is equivalent to a carrier frequency in the ruling, must be at least three times greater than the maximum slope of the aspheric wavefront to assure complete separation of orders. Rather than using a tilt carrier to fan out the orders of diffraction laterally, CGH 110 may also be written with circular symmetry which preserves the rotational symmetry of most aspheric optics. The circular symmetry type of CGH disperses the orders along the axis, bringing them to focus at different axial positions. The use of circular holograms for optical testing is widely known and accepted, primarily because it is easy to manufacture. See generally, "Optical Shop Testing", second edition, K. Creath and J. C. Wyant, D. Malacara Ed. (Wiley, N.Y., 1992), pp. 602–612, as a reference for hologram plates and circular symmetry type computer-generated holograms.

Known related patents concerning the utilization of computer-generated holograms for testing aspheric surfaces are: U.S. Pat. No. 5,245,402 teaching placement of a CGH between a collimator and an aberration compensating lens for providing additional corrections of residual aberrations, (see also U.S. Pat. No. 4,824,193 teaching the use of a CGH for correcting aberrations in fiber-optic transmissions), and U.S. Pat. No. 5,039,223 teaching a conjugate positioning CGH arrangement for testing plural types of concave/convex aspherical surfaces without having to position the interferometer. European/German Patent No. EP 531909/DE 4130516 teaches producing a halogram having at least one binarisation noise null point in the Fourier spectrum of the halogram.

Therefore, a need is seen to exist for an improved and efficient apparatus and method for testing aspheric surfaces and wavefronts using a computer-generated halogram in a common-path interferometric configuration.

A need is further seen to exist to improve the precision of testing aspheric surfaces and wavefronts while reducing the cost of the optics required for testing by using a computer-generated halogram in a common-path interferometer.

SUMMARY OF THE INVENTION

Accordingly, the primary object of the present invention is to provide an improved and efficient apparatus and method for testing aspheric surfaces and wavefronts using a computer-generated hologram in a common-path interferometric configuration.

A similarly important object of the present invention is to provide an improved and efficient apparatus and method for testing aspheric surfaces and wavefronts that not only improves the precision of testing aspheric surfaces and wavefronts, but that also reduces the cost of the optics required for performing the test.

The foregoing objects are accomplished by providing an improved interferometer apparatus comprising a test plate member having a reference surface, whereon a computer-generated hologram (CGH) is written. In a testing configuration, the improved interferometer setup comprises, a laser light source, divergers, beamsplitters, collimators, and other auxiliary optics arranged in a common-path configuration to minimize measurement errors for testing an optical test piece with the test plate member having the computer-generated hologram. The test plate member and the test piece are preferably separated by a small gap typically on the order of less than or equal to five (5) millimeters. Gaps larger than five (5) millimeters between the test plate member and the test piece are also within the scope of the invention. The computer-generated hologram is written on the reference surface of the test plate member using lithographic, or other known industry techniques. The improved interferometer apparatus having a CGH on the reference surface of the test plate member may be used for measurement of any aspheric surface (convex, concave, or near-flat aspheric stirfaces). During interferometric testing of a test piece, fringes of interference are viewed through the test plate. By example, in an experimental setup having a test plate with a CGH of circular symmetry formed by annular rings of chrome spaced at intervals 80–500 micrometers and written with 5 micrometer accuracy, the measurement accuracy is expected to be better than 6 nanometers rms for testing mirrors with up to 331 micrometer departure from the best fit sphere. Higher accuracy can be attained for measurement of less aspheric surfaces.

Therefore, to the accomplishments of the foregoing objects, the invention consists of the foregoing features hereinafter fully described and particularly pointed out in the claims, the accompanying drawings and the following disclosure describing in detail the invention, such drawings and disclosure illustrating but one of the various ways in which the invention may be practiced.

DESCRIPTION OF THE PREFERRED EMBODIMENT

Figure 1:
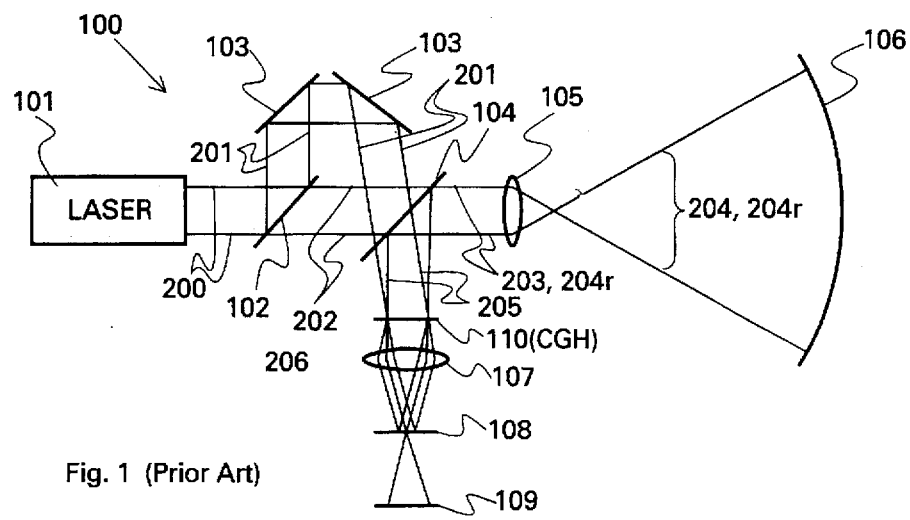
FIG. 1 shows a prior art arrangement, known as a modified Twyman-Green interferometer, which involves imaging an aspheric surface of an aspheric test piece onto a computer-generated hologram (CGH).
Figure 2:
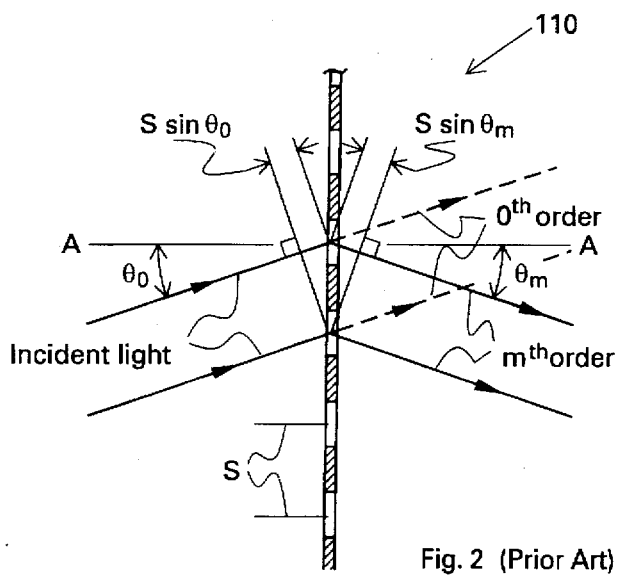
FIG. 2 shows a prior art portion of a computer-generated hologram as being a diffraction grating that uses a spatial variation in ruling frequency to create a desired change in a wavefront, and in particular, showing the geometry associated with a CGH that causes changes in a light ray's direction for determining the grating equation for the optical path difference.

As previously discussed, FIG. 1 shows a prior art arrangement, known as a modified Twyman-Green interferometer, which involves imaging an aspheric surface of an aspheric test piece onto a computer-generated hologram (CGH), while FIG. 2 shows a portion of a computer-generated hologram as being a diffraction grating that uses a spatial variation in ruling frequency to create a desired change in a wavefront. This arrangement, although utilizing a CGH, has the disadvantages that the test and reference beam paths are not common-path, and thus the test results contain measurement errors due to testing environment factors, such as illumination, vibration and air turbulence effects on the optics. Thus, if high precision is desired in an interferometric measurement, it is highly advantageous if the interferometer is as common-path as possible, i.e., the test beam path of the interferometer should be as identical as possible to the reference beam path. In this way, errors due to divergers, collimators, and other auxiliary optics in the interferometer do not show up as errors in the test measurement since the errors are shared by both beams equally.

Figure 3:
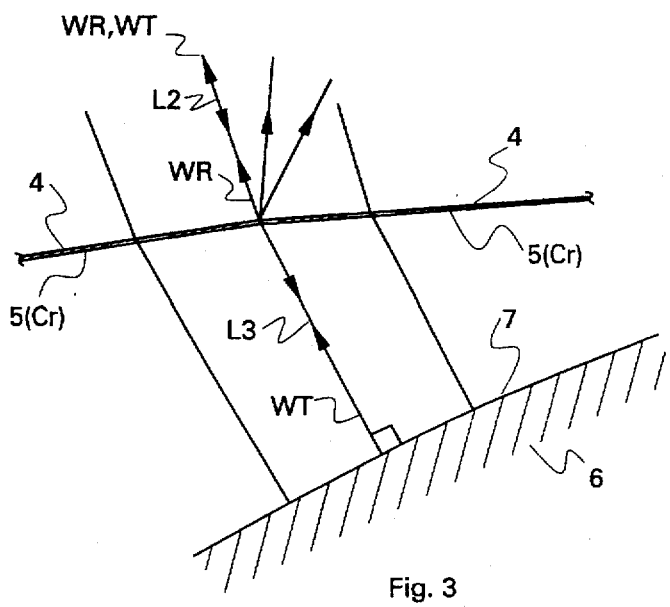
FIG. 3 shows an enlarged portion of the CGH test plate member and test piece illustrated in FIG. 4, illustrating in particular, the common-path configuration of the reference wavefront formed by light diffracting from the computer-generated hologram written on the reference surface of the test plate member.
Figure 4:
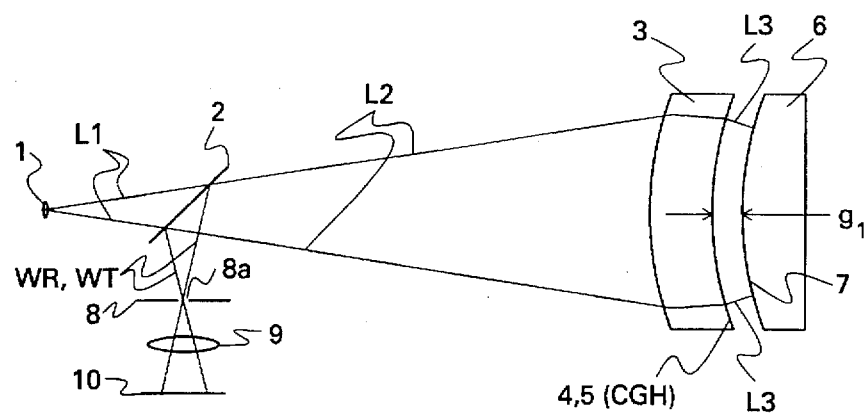
FIG. 4 shows an interferometer test system illustrating a test piece having an aspheric convex surface positioned after a test plate member having a concave reference surface with a computer-generated hologram written in accordance with the present invention.

One of the simplest setups that accomplishes a common-path configuration is a Fizeau-type interferometer arrangement where a test plate is used as the reference optic. The present invention preferably utilizes a modified Fizeau-type common-path configuration, wherein the test plate member is provided having a computer-generated hologram of the expected shape of the test piece's wavefront. FIG. 3 shows an enlarged portion of the test plate member 3 and test piece 6 as illustrated in FIG. 4. FIG. 3 illustrates, in particular, the common-path configuration of light L3 reflected as WT from aspheric surface 7 and the reference wavefront WR formed by light L2 diffracting from the computer-generated hologram 5 written on the reference surface 4 of the test plate member 3. The CGH is designed to make the reference beam WR match the test wavefront WT so it also retraces its path. The grating is composed of opaque bands, or patterns, written directly onto the reference surface. FIG. 3 shows, by example, CGH 5 written onto reference surface 4 as a chrome pattern using a laser. Lithographic, or other known industry techniques may be employed for writing a CGH.

Figure 5:
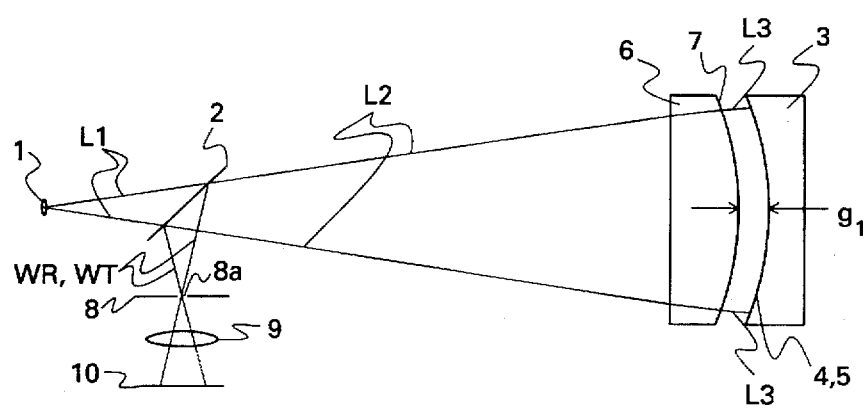
FIG. 5 shows the interferometer test system illustrated in FIG. 4 having the test plate member with the computer-generated hologram written on the concave reference surface positioned a predetermined distance after the test piece.
Figure 6:
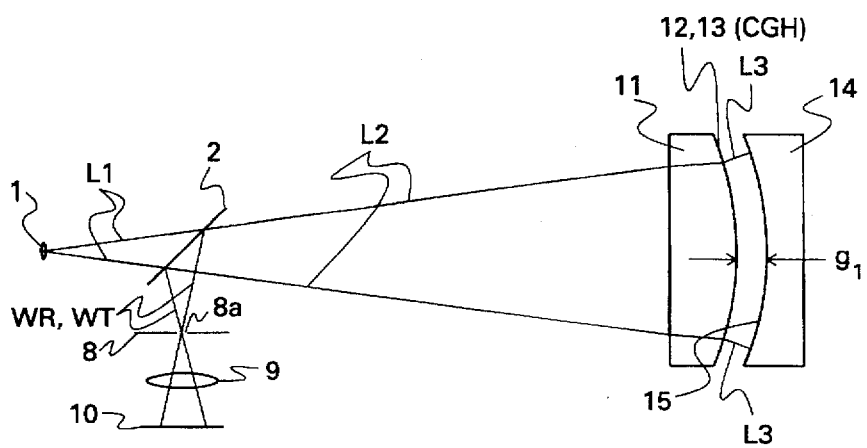
FIG. 6 shows an interferometer test system illustrating a test piece having an aspheric concave surface positioned a predetermined distance after a test plate member having a convex reference surface with a computer-generated hologram written in accordance with the present invention.

The interferometer arrangements shown in FIGS. 4–11 are Fizeau-type arrangements having computer-generated holograms 5, 13, 18, 24, 29, written on reference surfaces 4, 12, 17, 23, 28, respectively of the test plate members 3, 11, 16, 22, 27. As illustrated in FIG. 4, a beam of light L1 from laser point source 1 diverges through the beamsplitter 2 as light L2 to illuminate test plate member 3. Test plate 3 is designed such that light L2 bends so that it strikes aspheric test surface 7 of test piece 6 as light L3 at near-normal incidence for being reflected as WT off aspheric surface 7 for being returned along the same path, see FIG. 3. The reference wavefront WR is formed with light L2 diffracting from CGH 5 which is written directly onto the reference surface 4 of the test plate 3. This makes the test beam WT and reference beam WR fully common-path, eliminating any possibility of error due to illumination and imaging optics, such as aperture 8, 8a, lens 9 and imaging plane 10. This facilitates the use of low quality illumination optics without degrading the test accuracy. Only the difference between wavefronts WT and WR is measured. This characteristic allows the test setup to be economical, because the requirements on the large optics, including the refractive index variations in the test plate and local air turbulence and vibration effects, are quite loose. Only the reference spherical surface 4 of the test plate 3 must be fabricated and measured accurately, which is easy to do. In a circular symmetry CGH test plate, the diffracted orders may be separated using power or focus rather than using tilt in the CGH. This adds to the economical advantages of the present invention. A concave aspheric 14 may also be tested in a similar configuration as shown in FIG. 6. Here, the test plate reference surface 18 is convex with the CGH 13 written onto it and the test aspheric surface 15 is concave.

The CGH testing configurations as illustrated in FIGS. 4–11, can be designed by grouping the task into the hologram design and the illumination optical system design. If, by example only, the CGH tests illustrated in FIGS. 4–11 involve circular symmetry CGH, the hologram design of CGH's 5, 13, 24, 29, written on reference surfaces 4, 12, 23, 28, respectively of the test plate members 3, 11, 22, 27, would involve calculating the ring positions to give the desired phase of the reference wavefront WR and fixing the width of the rings to match the amplitudes of the test and reference beams. The illumination system 1, 2 is designed to bring the rays of light L1, L2 into the test at the correct angle to separate diffraction orders, and to minimize the mapping distortion in the test. Additionally, the design of the hologram consists of choosing several parameters. The gaps, depicted as g1, g2 in FIGS. 4–11, between the reference surfaces 4, 12, 23, 28 and the aspheric test surfaces 7, 15, 26 of test pieces 6, 14, 25 must be chosen as well as the amount of power in the hologram. The power is chosen to make the wavefront slope large enough that the adjacent order of diffraction are sufficiently separated such that the desired order can be isolated in the presence of illumination errors. Once the CGH power is determined, the required ring pattern and the radius of curvature of the reference surface are fully defined. The width of the rings is picked to match the intensities of the test and reference wavefronts to give a high contrast interference pattern. Both reference and test beams, WR, WT, are modulated by the hologram, and the far-field distribution is found by taking a Fourier transform. The test beam is the zero order transmitted wavefront, which is modulated purely in amplitude by the grating and the bands project as shadows onto the test surface. Wider bands decrease the 0-order test beam amplitude, but increase the −1 order efficiency of the reference beam. By example, for testing bare glass optics using chrome rulings, the optimum width is found for a duty cycle of 18%. The duty cycle is defined as the ratio of the metal ring width to the center-to-center band separation. After choosing the hologram power that gives the desired order separation, a computer simulation is made of the corresponding spherical reference spaced appropriately from the aspheric test surface. The ring pattern is defined by tracing rays normal to the secondary and finding the ray intersections with the spherical reference surface. The illumination system must get light pointing in the right direction and must provide a distortion-free image of the test surface to the camera plane. The design of this optical system is straightforward using commercially available optical design computer program. The required quality of the illumination system is determined by the smallest angular separation of the spurious orders of diffraction coming from the CGH. The quality of the illumination system need not be of high quality since the test is insensitive to errors below a few arc minutes.

Figure 7:
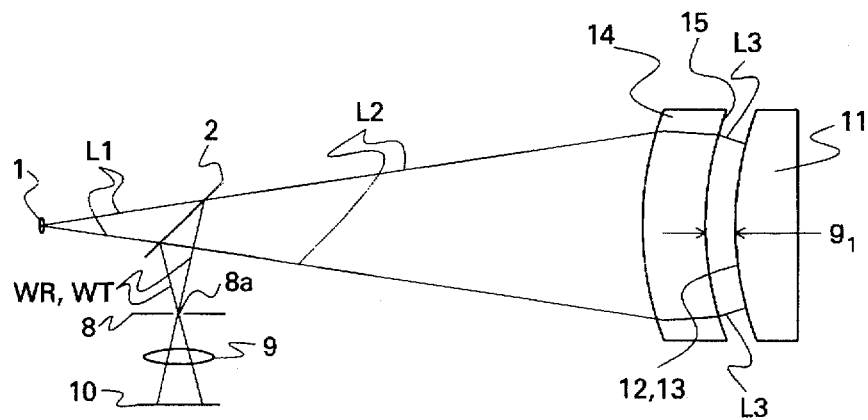
FIG. 7 shows the interferometer test system illustrated in FIG. 6 having the test plate member with the computer-generated hologram written on the convex reference surface positioned a predetermined distance after the test piece.

The present invention utilizing a modified Fizeau-type common-path configuration can be performed in several other configurations depending on the form and quality of the aspheric surface being tested. This is important because the aspheric surface will be used in light transmission and must assure that the orders are adequately separated at the aperture 8, 8a. In this regard, FIG. 5 shows the interferometer test system illustrated in FIG. 4 having the test plate member 3 with the computer-generated hologram 5, written on the concave reference surface 4, positioned a predetermined distance g1 after the test piece 6. Similarly, FIG. 7 shows the interferometer test system illustrated in FIG. 6 having the test plate member 11 with the computer-generated hologram 13 written on the convex reference surface 12 positioned a predetermined distance g1 after the test piece 14. The illumination and imaging components 1, 2, 8, 9, 10 are illustrated in FIGS. 4–11 as being the same for illustration purposes only. These components may be modified in accordance with the particular requirements of a project.

Figure 8:
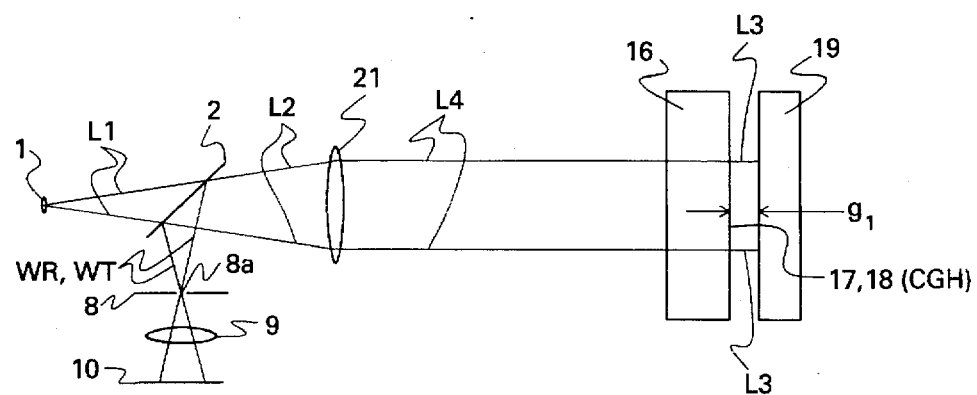
FIG. 8 shows an interferometer test system illustrating a test piece having a near-flat aspheric surface positioned a predetermined distance after a plano test plate member having a reference surface with a computer-generated hologram written in accordance with the present invention.
Figure 9:
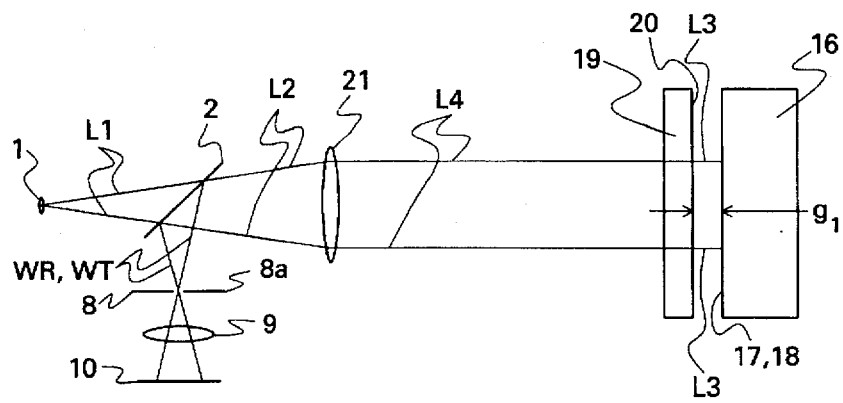
FIG. 9 shows the interferometer test system illustrated in FIG. 8 having the plano test plate member with the computer-generated hologram written on the plano reference surface positioned a predetermined distance after the test piece having a near-flat aspheric surface.

A near flat aspheric surface such as a Schmidt plate may also be tested in this configuration with the CGH written onto the flat reference surface of the test plate. FIG. 8 shows an interferometer test system illustrating a test piece 19 having a near-flat aspheric surface positioned a predetermined distance g1 after a plano test plate member 16 having a reference surface 17 with a computer-generated hologram 18 written in accordance with the present invention. As in the case of the concave and convex aspherics illustrated in FIGS. 4–7, the position of the test piece may be reversed. FIG. 9 shows the interferometer test system illustrated in FIG. 8 having the plano test plate member 16 with the computer-generated hologram 18 written on the plano reference surface 17 positioned a predetermined distance g1 after the test piece 19 having a near-flat aspheric surface 20. In this configuration, collimator lens 21 may be employed to produce light beam L4.

Figure 10:
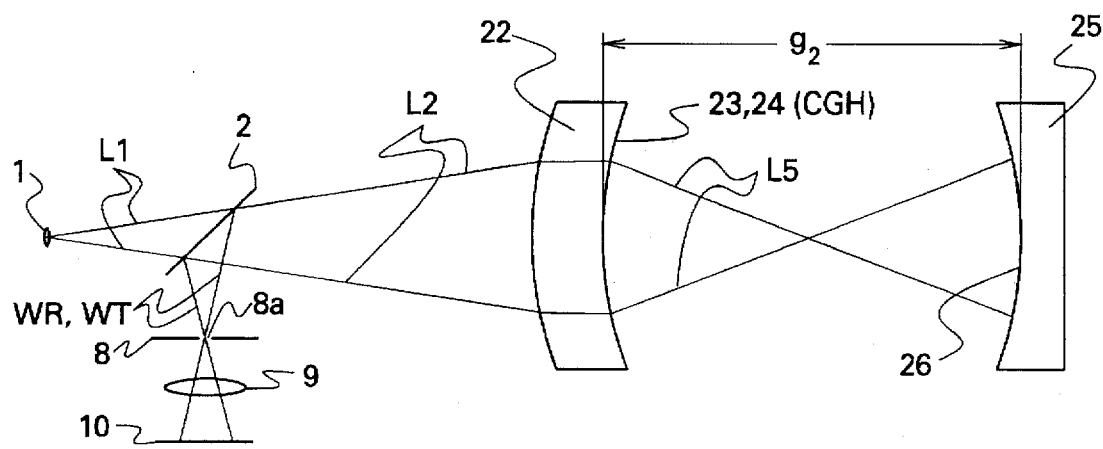
FIG. 10 shows an interferometer test system illustrating a test piece having an aspheric concave surface positioned a predetermined larger distance than illustrated in FIGS. 4–9 after a test plate member having a concave reference surface with a computer-generated hologram written in accordance with the present invention.
Figure 11:
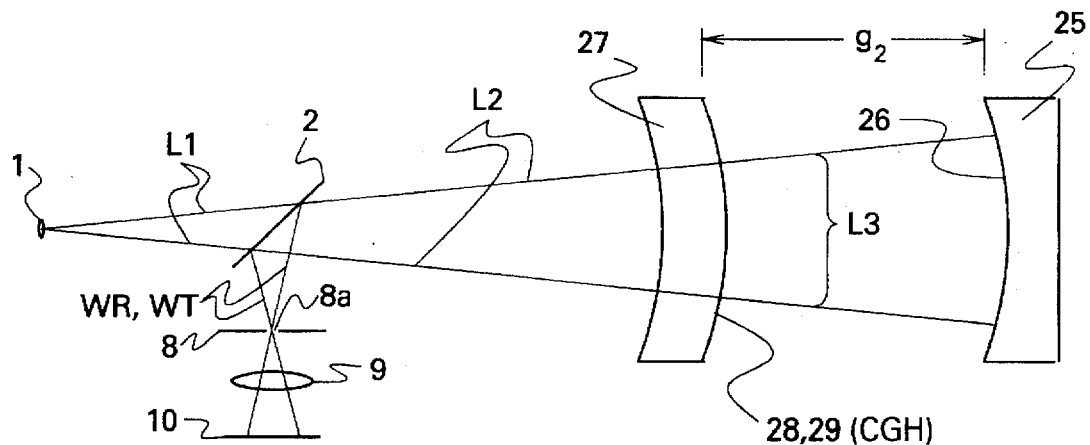
FIG. 11 shows an interferometer test system illustrating a test piece having an aspheric concave surface positioned a predetermined larger distance than illustrated in FIGS. 4–9 after a test plate member having a convex reference surface with a computer-generated hologram written in accordance with the present invention.

The spacing between the test plate and the test piece need not be very close as shown in FIGS. 10 and 11. Here, the spacing g2 is typically greater than 5 millimeters up to several hundred meters. The test is still very nearly common-path, although the longer test path of light L5, L3 through the air makes these configurations more susceptible to air turbulence effects. FIG. 10 shows an interferometer test system illustrating a test piece 25 having an aspheric concave surface 26 positioned a predetermined larger distance g2 which is greater than spacing g1 illustrated in FIGS. 4–9, and being positioned after a test plate member 22 having a concave reference surface 23 with a computer-generated hologram 24 written in accordance with the present invention. Similarly, FIG. 11 shows an interferometer test system illustrating a test piece 25 having an aspheric concave surface 26 positioned a predetermined larger distance g2 which is greater than g1 illustrated in FIGS. 4–9, and being positioned after a test plate 27 member having a convex reference surface 28 with a computer-generated hologram 29 written in accordance with the present invention.

Therefore, while the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus.

We claim:

1. An interferometer apparatus, said apparatus comprising:
   (a) a test piece having an aspheric test surface upon which incident light reflects, thereby forming a test wavefront beam;
   (b) a test plate member, said test plate member having a reference surface selected from the group consisting of a spherical surface and a planar surface; and
   (c) a single computer-generated hologram pattern written on said reference surface for producing a reference wavefront beam, said single computer-generated hologram pattern having a shape that provides a null test configuration, said interferometer apparatus configured such that said test wavefront beam travels along a same path as said reference wavefront beam.

2. An interferometer apparatus as described in claim 1, wherein:
   said apparatus further comprises, divergers, beamsplitters, collimators, and other auxiliary optics being arranged with said test plate member provided with said computer-generated holograms such that said test wavefront beam and said reference wavefront beam being produced by said interferometer apparatus comprise being in common-path configuration to minimize measurement errors.

3. An interferometer apparatus as described in claim 2, wherein:
   said test plate member and said test piece are separated by a predetermined distance less than or equal to five (5) millimeters.

4. An interferometer apparatus as described in claim 2, wherein:
   said test plate member and said test piece are separated by a predetermined distance greater than or equal to five (5) millimeters.

5. An interferometer apparatus as described in claim 1, wherein:
   said computer-generated hologram pattern comprises an opaque pattern written on said reference surface.

6. An interferometer apparatus as described in claim 5, wherein:
   said opaque pattern comprises a layer of chrome written on said reference surface by a laser beam.

7. An interferometer apparatus as described in claim 1, wherein:
   said test piece has an aspheric convex surface, said test piece being positioned in said apparatus after said test plate member.

8. An interferometer apparatus as described in claim 1, wherein:
   said test piece has an aspheric convex surface and said test plate member is positioned in said apparatus after said test piece such that said reference wavefront beam passes through said test piece.

9. An interferometer apparatus as described in claim 1, wherein:
   said test piece has an aspheric concave surface, said test piece being positioned in said apparatus after said test plate member.

10. An interferometer apparatus as described in claim 1, wherein:

said test piece has an aspheric concave surface and said test plate member is positioned in said apparatus after said test piece such that said reference wavefront beam passes through said test piece.

11. An interferometer apparatus as described in claim 1, wherein:

said test plate member comprises a plano test plate.

12. An interferometer apparatus as described in claim 11, wherein:

said test piece has a near-flat aspheric surface, said test piece beingpositioned in said apparatus after said plano test plate member.

13. An interferometer apparatus as described in claim 11, wherein:

said test piece has a near-flat aspheric surface and said plano test plate member is positioned in said apparatus after said test piece such that said reference wavefront beam passes through said test piece.

14. An interferometer apparatus as described in claim 1, wherein:

said computer-generated hologram pattern comprises a pattern written on said reference surface utilizing circular symmetry.

15. The interferometer apparatus of claim 1 wherein said reference surface comprises a spherical surface, said test piece is positioned in said interferometer apparatus after said test plate member, and said test plate member has light transmission characteristics that facilitate bending an incident beam such that a transmitted light beam strikes said aspheric test surface of said test piece at near-normal incidence for being reflected as said test wavefront beam along a same path as said reference wavefront beam.

16. An interferometer apparatus, said apparatus comprising:

(a) a test piece having an aspheric test surface upon which incident light reflects, thereby forming a test wavefront beam;

(b) a test plate member, said test plate member having a reference surface selected from the group consisting of a spherical surface and a planar surface; and (c) a single computer-generated hologram having circular symmetry written on said reference surface, said single computer-generated hologram being used for producing a reference wavefront beam, said single computer-generated hologram pattern having a shape that provides a null test configuration, said test plate member having light transmission characteristics that facilitate bending an incident light beam such that a transmitted light beam strikes said aspheric test surface of said test piece at near-normal incidence for being reflected as said test wavefront beam along a same path as said reference wavefront beam.

17. An interferometer apparatus as described in claim 16, wherein:

said test plate member, said test piece and other auxiliary optics associated with said apparatus comprise being arranged to produce a common-path configuration for minimizing measurement errors during optical manipulation of said test and reference wavefront beams produced by said interferometer apparatus.

18. An interferometer apparatus as described in claim 16, wherein:

said computer-generated hologram pattern comprises a layer of chrome written on said reference surface by a laser beam.

19. A method for measuring aspheric optical surfaces in a null test configuration, said method comprising the steps of:

(a) providing an interferometer testing system, said system comprising a test plate member provided with a reference surface selected from the group consisting of a spherical surface and a planar surface, said reference surface having a single computer-generated hologram pattern written thereon, said single computer-generated hologram pattern being used for producing a reference wavefront beam, said single computer-generated hologram pattern having a shape that provides a null test configuration;

(b) providing a test piece having an aspheric optical surface;

(c) arranging said test plate member and said test piece for conducting a surface measurement test of said aspheric optical surface in a null test configuration; and (d) interferometrically measuring said aspheric optical surface by producing said reference wavefront beam using said single computer-generated hologram pattern and producing said test wavefront beam by reflecting an incident beam from said aspheric optical surface, said interferometer testing system being configured such that said test wavefront beam travels along a same path as said reference wavefront beam.

20. A method for measuring aspheric optical surfaces as described in claim 19, wherein:

said step of providing an interferometer testing system comprises providing a Fizeau-type of interferometer having structure that facilitates optical manipulation of said test and reference wavefront beams that comprise a step of said test and reference wavefront beams sharing a common-path.

21. The method of claim 19 wherein:

said aspheric optical surface is selected from the group consisting of an aspheric convex surface, an aspheric concave surface, and a near-flat aspheric surface, and said test piece is positioned after said test plate member.

22. The method of claim 19 wherein:

said aspheric optical surface is selected from the group consisting of an aspheric convex surface, an aspheric concave surface, and a near-flat aspheric surface, and said test plate member is positioned after said test piece such that said reference wavefront beam passes through said test piece.

23. The method of claim 19, wherein:

said computer-generated hologram pattern comprises a pattern written on said reference surface utilizing circular symmetry.

24. The method of claim 19 wherein said reference surface comprises a spherical surface.

25. The method of claim 19 wherein said test piece is positioned after said test plate member and said test plate member has light transmission characteristics that facilitate bending an incident beam such that a transmitted light beam strikes said aspheric optical surface of said test piece at near-normal incidence for being reflected as said test wavefront beam along a same path as said reference wavefront beam.

* * * * *